United States Patent [19]
Loyd

[11] 3,917,286
[45] Nov. 4, 1975

[54] LIP SEAL ASSEMBLY FOR CRANKSHAFTS
[75] Inventor: Lee R. Loyd, Peoria, Ill.
[73] Assignee: Caterpillar Tractor Co., Peoria, Ill.
[22] Filed: Sept. 14, 1973
[21] Appl. No.: 397,446

[52] U.S. Cl. .................. 277/37; 277/153; 277/187
[51] Int. Cl.² ........................................ F16J 15/32
[58] Field of Search ............ 277/37, 153, 170, 187, 277/183

[56] References Cited
UNITED STATES PATENTS

| | | | |
|---|---|---|---|
| 2,316,713 | 4/1943 | Procter | 277/153 |
| 3,179,427 | 4/1965 | Rizzo | 277/235 |
| 3,356,376 | 12/1967 | Bradfute et al. | 277/37 |
| 3,443,817 | 5/1969 | Reiling | 277/153 |
| 3,743,305 | 7/1973 | Berens | 277/37 |

FOREIGN PATENTS OR APPLICATIONS

| | | | |
|---|---|---|---|
| 1,000,879 | 8/1965 | United Kingdom | 277/153 |
| 1,930,149 | 12/1970 | Germany | 277/37 |

Primary Examiner—Samuel B. Rothberg
Attorney, Agent, or Firm—Phillips, Moore, Weissenberger, Lempio & Strabala

[57] ABSTRACT

A metal case lip seal is detachably mounted in a bore of an engine block to have a flexible annular lip of a sealing element thereof sealingly contact a crankshaft. The sealing element further comprises a first annular portion which axially engages the block to form a static seal thereat and a second annular portion connected to the first portion at a reverse bend. The second annular portion functions to pilot the lip seal in the bore and also permits limited radial movement thereof during crankshaft operation.

4 Claims, 2 Drawing Figures

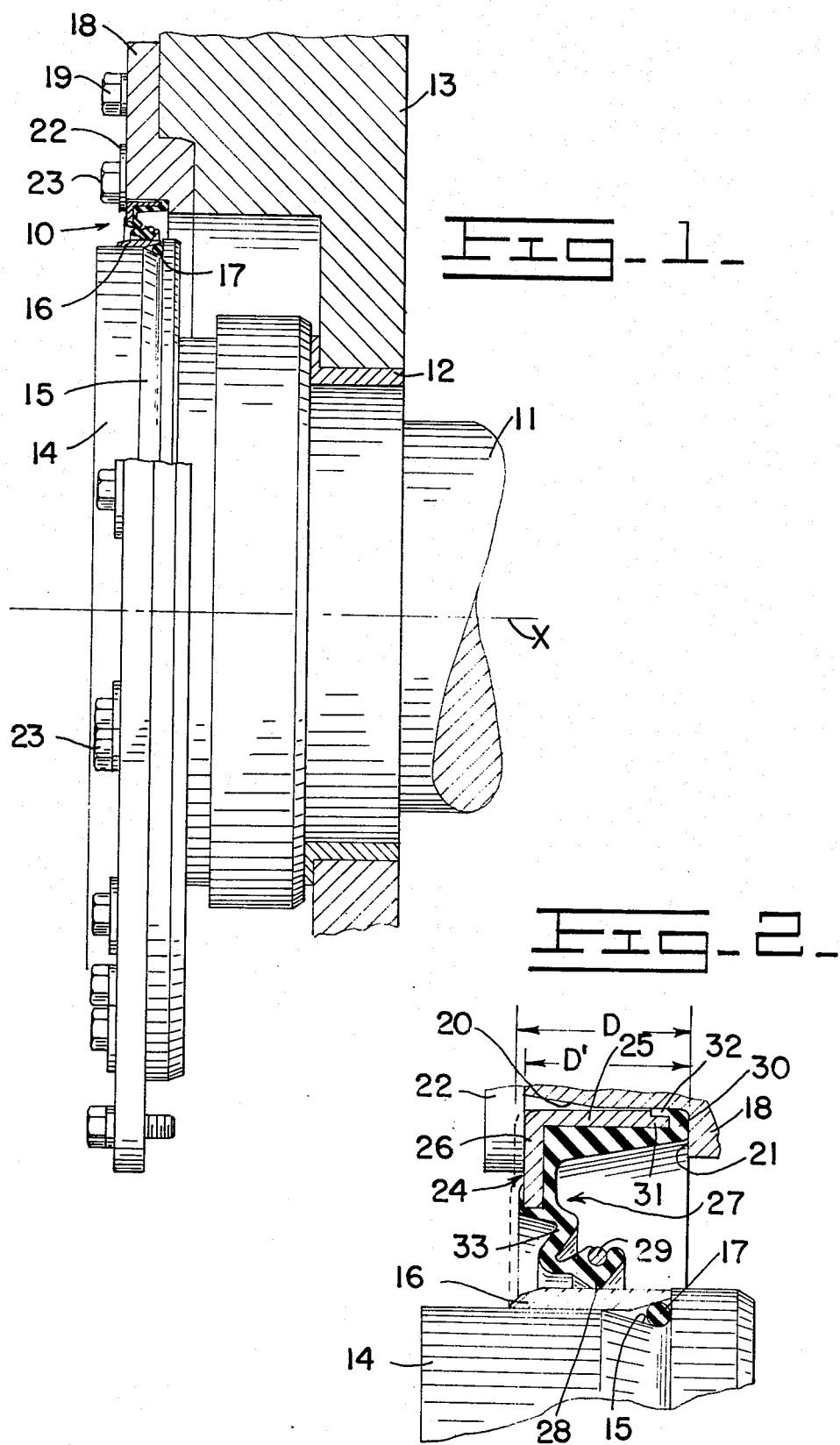

LIP SEAL ASSEMBLY FOR CRANKSHAFTS

BACKGROUND OF THE INVENTION

Metal case lip seals are oftentimes mounted between an engine block and a crankshaft to seal the engine's crankcase against leakage and to prevent the ingress of contaminants therein. Such seals are normally press-fitted into a mating bore, formed in the engine block, to maintain a flexible lip in sealing contact with the crankshaft. In addition to giving rise to sealing problems, due to the distortion of or the damage to the seal during engine operation, it has proven difficult to remove the seal without damaging the seal, the bore and/or the crankshaft. U.S. Pat. Nos. 3,408,084 and 3,575,426, as well as page 300 of the 1967 SAE Handbook, each disclose seal assemblies of this type.

SUMMARY OF THIS INVENTION

An object of this invention is to provide a non-complex, economical and durable lip seal assembly adapted for expeditious installation and removal. The lip seal assembly, finding particular application for efficiently sealing the crankcase of an internal combustion engine, comprises an annular case having a sealing element secured therein. The sealing element comprises a flexible annular lip maintained in sealing contact with the crankshaft, a first annular portion extending radially outwardly into static sealing contact axially between the case and housing and a second annular portion connected to the first annular portion by a reverse bend and disposed radially between the case and the housing.

BRIEF DESCRIPTION OF THE DRAWINGS

Further objects of this invention will become apparent from the following description and accompanying drawings wherein:

FIG. 1 is a partially sectioned, side elevational view illustrating a lip seal assembly embodiment of this invention mounted between the block and crankshaft of an internal combustion engine; and FIG. 2 is an enlarged, sectional view of the lip seal assembly.

DETAILED DESCRIPTION

FIG. 1 illustrates a lip seal assembly 10 in association with a crankshaft 11 of an internal combustion engine. The crankshaft is mounted in axially spaced split sleeve bearings 12 (one shown), secured to the engine block or housing 13, for rotation about a longitudinal axis X. The crankshaft has an annular hub 14 secured on an outboard end thereof.

A circumferential groove 15 is formed on the hub, adjacent to a flange thereof, and an annular wear ring 16 is press-fitted onto the hub. An O-ring seal 17 is disposed in the groove, which underlies the wear ring, to engage the inner surface of the wear ring for sealing purposes. An annular adapter 18 is detachably mounted on the housing by a plurality of circumferentially disposed bolts 19 and has a bore 20 formed therein which is concentric with respect to hub 14.

The bore extends inwardly to a limited depth from the outer end of the adapter to an annular shoulder 21. Lip seal assembly 10 is disposed within the bore and is retained therein by a plurality of circumferentially disposed retainers 22, each detachably mounted on the adapter by a bolt 23. The lip seal assembly comprises a rigid annular case 24 having an axially extending outer wall 25 disposed in concentric relationship with respect to axis X and a radially inwardly extending end wall 26.

The lip seal assembly further comprises a plastic or rubber-based resilient, flexible sealing element 27 preferably bonded to the case. The sealing element has a V-shaped annular lip 28 disposed in dynamic sealing contact with wear ring 16. An annular garter spring 29 surrounds the lip for positively urging the lip into such sealing contact.

The sealing element further comprises a first annular portion 30 extending generally radially outwardly from axis X and maintained in static sealing contact axially between an end 31 of the case and shoulder 21 of the housing. A second annular portion 32, connected directly to the first annular portion by a reverse bend, extends generally parallel with respect to axis X and away from the first annular portion. The second annular portion is maintained radially between outer wall 25 of the case and an inner wall of the housing defining bore 20.

When the lip seal assembly is mounted in bore 20, second annular portion 32 of the sealing element will function as a pilot to guide the lip seal assembly into its proper sealing relationships. In order to insure such sealing relationships, the sealing element is compressed from its relaxed axial dimension D, shown by broken lines in FIG. 2, to its compressed dimension D'. Such compression is precisely effected by the attachment of retainers 22 to adapter 18.

In addition to its piloting function, second annular portion 32 of the sealing element will permit the main body portion of the integrated seal assembly, carrying case 24, to "float" radially a slight amount to compensate for possible misalignments occurring upon installation and during engine operation. An annular throat portion 33 of the sealing element, having a cross section substantially narrower than that of lip 28, cantilevers the main body portion of the sealing element on the lip to aid in the latter function.

What is claimed is:

1. A lip seal assembly in combination with a stationary housing, having an axial bore and an annular shoulder formed therein, a shaft rotatably mounted in said bore for rotation about a longitudinal axis thereof, an annular hub secured on said shaft and an annular wear ring secured on said hub, an annular groove formed on said hub to underlie said wear ring and an O-ring seal disposed in said groove to sealingly contact said wear ring, comprising an annular case including an annular outer wall having a recessed end disposed adjacent said shoulder,
a sealing element, mounted on said case extending between said wear ring and said housing, including
an annular flexible lip means circumventing and maintained in dynamic sealing contact with said wear ring,
a first annular portion extending generally radially outwardly from said axis engaged by said case wall end and maintained in static sealing contact axially between said case and said annular shoulder by compressing it thereagainst, and
a second annular portion connected directly to said first annular portion by a reverse bend and extending away from said first annular portion in general parallel relationship with respect to said axis and maintained radially between said recessed end of said annular wall and said shoulder, whereby said second annular portion is maintained in said parallel relationship, and an annular adapter releasably attached to an outboard side of said housing and at least one retainer releasably attached on an outboard side of said adapter and contacting an outboard side of said case to precisely retain said lip seal assembly in place on said housing.

2. The lip seal assembly of claim 1 wherein said housing is mounted in an internal combustion engine and said shaft constitutes a crankshaft mounted for rotation in said engine.

3. The lip seal assembly of claim 1 wherein a main body portion connecting said flexible lip means and said first annular portion is permitted to move radially.

4. The lip seal assembly of claim 3 wherein said sealing element further comprises an annular throat portion, substantially narrower than said lip in cross section, connecting said lip and the main body portion of said sealing element together.

* * * * *